United States Patent Office 3,478,117
Patented Nov. 11, 1969

3,478,117
CYCLOPENTADIENES
Victor Mark, Olivette, Mo., assignor to Monsanto Company, St. Louis, Mo., a corporation of Delaware
No Drawing. Filed July 25, 1960, Ser. No. 44,890
Int. Cl. C07c 17/26, 43/18
U.S. Cl. 260—648
4 Claims This invention relates to new organic compounds which have valuable properties as are hereinafter described. More particularly the invention relates to substituted cyclopentadienes. Specificaally the invention relates to new chemical compounds which are pesticides and useful intermediates in the preparation of other highly toxic pesticides, and especially insecticides.

In recent years synthetic organic pesticides have come into wide use. One important class of organic pesticidal compounds are the highly chlorinated polycyclic compounds. Many of these compounds are extremely toxic to insects, mites, ticks, centipedes, silverfish, and other animal pests of the phylum arthropoda. The general usage of these compounds in the control of lower animal populations is often not practicable because they are also very toxic to desirable wildlife, domestic animals and humans. Because of the danger and inconvenience to agricultural workmen, the use is frequently not favored, even though many of the compounds to have very desirable toxic effects on the objectionable animal life.

One purpose of this invention is to provide a means of preparing a new class of compounds which are useful as pesticides and as intermediates in the synthesis of very toxic insecticides with low human and domestic animal toxicity. Other purposes will be apparent from an examination of the following description of the invention.

In accordance with this invention halocyclopentadienes and phosphorous acid esters undergo a completely novel reaction to form a family of compounds, all of which are new. This reaction may be described generically by the following equation:

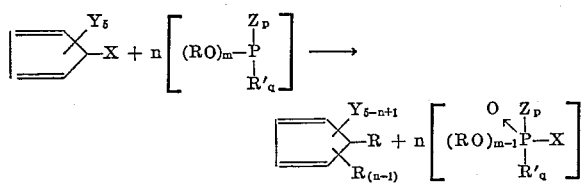

wherein R and R' may be any of a wide variety of organic radicals as are described more fully hereinafter; wherein Y is hydrogen, chlorine, iodine, bromine, fluorine or an organic radical; wherein X and Z are chlorine, iodine, brome or fluorine; and wherein $n$ is an integer from one (1) to six (6) representing the number of halogens replaceable by organic radicals; $m$ is an integer from one (1) to three (3) representing the number of available organic groups (RO groups) of the phosphite; $p$ is an integer from zero (0) to two (2); $q$ is an integer from zero (0) to two (2), provided that $m+p+q$ is always three.

In the above structural formula the R and R' symbols may be the same or different and in the preferred modifications the alkyl aryl, aralkyl and alkaryl radicals will have up to 8 carbon atoms.

In accordance with the above defined reaction a wide variety of halo substituted cyclopentadienes may be reacted with a large number of different phosphorous esters.

Suitable cyclopentadienes for substituting with the various organic radicals are the hexahalocyclopentadienes, such as:

hexachlorocyclopentadiene

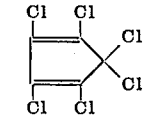

1,2,3,4-tetrachloro-5,5-difluorocyclopentadiene

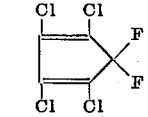

hexabromocyclopentadiene

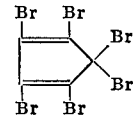

1,2-dichloro-3,4,5,5-tetrafluorocyclopentadiene

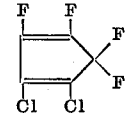

and other halocyclopentadienes such as:

1,2,3,4,5-pentachlorocyclopentadiene

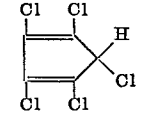

1,1,3-trichloroindene

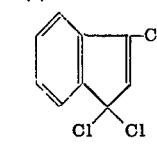

Perchloroindene

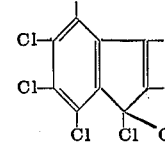

1,3,4-trichloro-2-methoxy-5,5-difluorocyclopentadiene

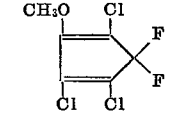

1,1,3-tribromindene

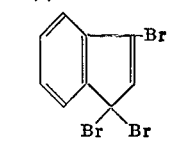

9,9-dichlorofluorene

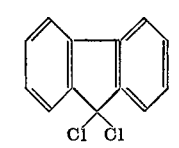

In addition to above enumerated halogen substituted cyclopentadienes, all of which are reported in the literature, other hexahalocyclopentadienes may be used, such as hexafluorocyclopentadiene and hexaiodocyclopentadiene. Useful compounds include other mixed hexahalocyclopentadienes, such as 1,2,3,4-tetrachloro-5,5-dibromocyclopentadiene and 1,2,3,4,5-pentabromo-5-chlorocyclopentadiene and halocyclopentadienes with fewer than six halogen atoms, for example, 5-chloro-cyclopentadiene, 5,5 - dichlorocyclopentadiene, 5,5-dibromocyclopentadiene, 1,2,4,5 - tetrachloro - 3,5 - dimethoxycyclopentadiene, 1,2,3 - trifluoro - 5 - chloro - 5 - methylcyclopentadiene, 1,2,3,4 - tetramethyl - 5,5 - dibromocyclopentadiene, 4-phenyl - 5,5 - dichlorocyclopentadiene, 9 - chloro - 9-bromofluorene, 1 - chloroindene, 1,4 - dimethoxy - 5,5-diiodocyclopentadiene, 1,2,4,5,5 - pentafluorocyclopentadiene, 1,2,4,5 - tetrachloro - 3,5 - bis(methylthio)cyclopentadiene - 1,2,3,5 - tetrachloro - 4,5 - bis(dimethylamino)cyclopentadiene.

The essential characteristic of the useful compounds is the presence of a halogen atom on the allylic carbon atom (the carbon atom which is not involved in a carbon to carbon double bond of the cyclopentadiene nucleus). In addition to the specific compounds defined in the two preceding paragraphs, a wide variety of other substituents may appear on the cyclopentadiene structure. In addition to one or more halogen atoms, at least one of which must be substituted on the allylic carbon, there may be any of a wide variety of organic radicals.

The procedure of this invention may be used to prepare substituted halocyclopentadienes by substituting on the allylic carbon atom at least one of the groups identified as R in the above structural equation: The R radical is selected from the class consisting of hydrocarbon radicals having up to 20 carbon atoms and selected from the group consisting of alkyl, alkenyl, alkynyl, cycloaliphatic, hydrocarbon substituted cycloaliphatic (particularly the alkyl substituted) aryl, hydrocarbon substituted aryl, (particularly the aliphatic and araliphatic substituted aryl), araliphatic hydrocarbon substituted araliphatic radicals, (particularly the aliphatic substituted araliphatic radicals) and the said hydrocarbon radicals containing substituents of the group consisting of chlorine, bromine, fluorine, iodine, hydrocarbonoxy, (particularly alkoxy, aryloxy and aralkoxy) nitro, cyano, thiocyano, isocyano, mercapto, hydroxyl, acyloxy, isothiocyano, acyl, hydrocarbonoxycarbonyl, hydrocarbonthio, (particularly the alkylthio, arylthio and aralkylthio) amino, hydrocarbonamino, hydrocarbonsulfonyl, hydrocarbonsulfinyl radicals, the heterocyclic substituents, furyl, thiophenyl, pyridyl, piperidyl, morpholyl, tetrahydrofuryl, and dihydrofuryl, and the hydrocarbon and acyl groups of said substituents having up to 20 carbon atoms; the Y groups in the above described new compounds may be selected from the group consisting of any of the defined R radicals, chlorine, bromine, fluorine, iodine, hydrogen, hydrocarbonoxy radicals, hydrocarbonthio radicals, and partial radicals such that 2 Y's on adjacent carbon atoms are parts of fused rings of the group consisting of benzene, cyclohexane, cyclohexene, dioxane, oxathiane, piperidine, furan, thiophene, morpholine, cyclopentane, cyclopentene, cycloheptene, cycloheptane, and said rings containing halogen substituents.

Suitable organic substituents in the R and Y positions on the cyclopentadiene may be hydrocarbon radicals containing up to 20 carbon atoms; including the alkyl radicals, such as methyl, ethyl, n-propyl, isopropyl, t-butyl, pentyl, dodecyl and ethylhexadecyl radicals; the alkenyl radicals, such as allyl, isopropenyl, methallyl, crotyl, undecenyl, octadecenyl, piperylenyl and sorbyl radicals; the alkynyl radicals, such as propargyl, tetrolyl and octadecynyl radicals; the araliphatic radicals, such as the benzyl, the phenethyl, the cinnamyl and the phenylhexadecyl radicals; the hydrocarbon substituted araliphatic radicals, such as 2,4-dimethyl benzyl, p-cyclohexylphenethyl and p-isopropylcinnamyl; the aryl radicals, such as phenyl, naphthyl and biphenyl radicals; the hydrocarbon substituted aryl radicals, such as 2,4,dimethyl phenyl, 2-allylnaphthyl, p - cumenyl, and cyclopentylphenyl; the cycloaliphatic radicals, such as cyclohexyl, cyclopentyl, cyclohexenyl, cyclopentenyl, cycloheptyl, and cyclo-octyl radicals; the hydrocarbon substituted cycloaliphatic radicals, such as phenylcyclopentyl, benzylcyclo-octyl, propylcyclohexyl and the dimethyl cycloheptenyl radicals; and the said hydrocarbon radicals containing substituents of the group consisting of chlorine, such as 2-chloroethyl, 2,4-dichlorophenyl, p-chlorobenzyl; and bromine, such as 3 - bromobutyl, 2 - bromo - 4 - chlorobenzyl and 2,4,5-tribromophenyl; iodine substituents, such as 2,4,6-triiodo benzyl and p-iodophenyl; and the fluorine substituents such as trifluoroethyl and p-fluorobenzyl; nitro substituted radicals, such as m-nitrobenzyl; cyano substituted radicals such as cyanoethyl; isocyano, such as 3-cyanoisopropyl; thiocyano, such as thiocyanobenzyl; the isothiocyano radicals, such as p-isothiocyanophenyl and 2-isothiocyanoethyl; mercapto substituted radicals, such as 2-mercaptoethyl; the hydroxyl substituted radicals such as p-hydroxyphenyl and 2,3-dihydroxypropyl; the hydrocarbonoxy radicals, such as p-methoxyphenyl, p-2-decyloxyethyl, and p-phenoxybenzyl radicals; the acyloxy substituted radicals such as the o-acetyloxyphenyl, the acyl substituted radicals such as 2-acetylethyl and p-butyrylbenzyl; the hydrocarbonoxycarbonyl radicals, such as hexyloxycarbonylethyl, phenoxycarbonylphenyl, methoxycarbonylcyclohexyl; hydrocarbonthio substituted radicals, such as 4-ethylthiobutyl, 3 - phenylthiopropyl and cyclohexylthiophenyl; the amino radicals, such as p-aminophenyl; the hydrocarbonamino substituted radicals, such as dimethylaminoethyl, 2-anilinoethyl, and p-cyclohexylaminobenzyl; the hydrocarbon sulfonyl substituted radicals, such as o-dodecylsulfonylbenzyl; p-phenylsulfonylphenyl, 2-benzylsulfonylethyl and p-cyclohexylsulfonylbenzyl; the hydrocarbon sulfinyl, such as 3(2-ethylhexylsulfinyl)propyl, p-phenylsulfinylphenyl, and 2-cyclohexylsulfinylpropyl; and the heterocyclic substituents such as furfuryl, thenyl, tetrahydrofurfuryl, 2-morpholylethyl, p-pyridylphenyl and 3-piperidylpropyl.

In the preparation of the new compounds the reactants should be so selected that the substituents on the hydrocarbon radicals described above do not react with any component of the reaction mixture. Due to the very mild conditions usually involved in the practice of the invention no difficulty will usually be had in effecting the reactions. Furthermore, minor amounts of side reaction products, if formed, can be readily separated.

The above identified organic radicals may be substituted in either the R or Y position, but in addition the Y position, but not the R position, may be substituted with chlorine, bromine, fluorine, and iodine as above are described, but also hydrogen and the organic radicals, such as the hydrocarbonoxy radicals or the hydrocarbonthio radicals, for example, methoxy, n-propylthio, phenoxy, octadecyloxy, phenylthio, benzoxy phenylthio, cyclohexoxy, methallylthio, benzylthio, methoxypropoxy, and furfuryloxy radicals, may be present. Other organic substituents may be those which are attached to a plurality of positions, usually on adjacent carbon atoms, of the cyclopentadiene and will form a fused ring selected from the group consisting of benzene, naphthalene, cyclohexane, cyclohexene, dioxane, oxathiane, furan, thiophene, morpholine, piperidine, cyclopentane, cyclopentene, cycloheptane, cycloheptene and said rings containing halogen substituents.

Typical cyclopentadienes which have organic substituents symbolized by Y are:

2,5-dichlorocyclopentadiene
5,5-dichloro-2,3-bis(chloromethyl)cyclopentadiene
4,4-dichloro-2,5-cyclopentadiene-1,2-dicarboxylic acid dimethylester
5-chloro-2-methoxycyclopentadiene
1,2,3,4,5-pentachloro-5-trichloromethylcyclopentadiene
2,3,4,5,5-pentachloro-1-trichlorovinylcyclopentadiene
5-chloro-5-ethynylcyclopentadiene
5,5-dichloro-1,2,3-4-tetraphenylcyclopentadiene
  pentachlorocyclopentadien-2-yl dimethyl phosphate
1,2,3,4,5-pentachloro-5-methylthiocyclopentadiene
1,2,4,5-tetrabromo-3,5-dimethylcyclopentadiene
1,1,3-trichloro-5-nitroindene
9,9-dichloro-2,7-dimethoxyfluorene
1,2,3,4,5-pentachloro-5-ethylsulfonylcyclopentadiene
1,2,3,4,5-pentachloro-5-dimethylaminocyclopentadiene
1,2,3,4,5-pentachloro-5-bis(2,3,3-trichloroallyl)aminocyclopentadiene
5-chloropentamethylcyclopentadiene
4,4,5,6-tetrachloro-4H-cyclopenta[b] furan
1,2,3,4,5-pentachloro-5(undecyl-10-en-1-yl)cyclopentadiene
5,5-dichloro-1-mercaptomethylcyclopentadiene
1,2,4,5-tetrachloro-3(p-trifluoromethylbenzyl)5-methylcyclopentadiene
5,5-dichloro-1,4-diacetylcyclopentadiene
5-chloro-5-methylcyclopentadiene-1,4-dimethanol
5-chloro-5-methylcyclopentadiene-1,4-dimethanol diacetate
5,5-dichlorocyclopentadiene-2,3-dimethanethiol cyclic thiocarbonate
1,2,4,5-tetrachloro-5-ethyl-3(3-nitrobutyl)cyclopentadiene
1,2,3,5-tetrachloro-5-ethyl-4(2-thiocyanoethyl)cyclopentadiene
1,2,3,4,5-pentachloro-5-methylsulfinylcyclopentadiene
1,2,3,5,5-pentachloro-4-tetrachloroethylcyclopentadiene The R group of the above structure derived from the phosphite may be any of the organic radicals described above with respect to Y substituent as hydrocarbon and substituted hydrocarbon radicals. By the selection of the organic phosphite, phosphonite, phosphinite, and halophosphite to provide the desired organic radical on the allylic carbon atoms a wide variety of compounds can be prepared. For purposes of illustration the products of reaction of the selected phosphorous ester with hexachlorocyclopentadiene may be:

5-n-butyl-1,2,3,4,5-pentachlorocyclopentadiene
5-isobutyl-1,2,3,4,5-pentachlorocyclopentadiene
5-sec-butyl-1,2,3,4,5-pentachlorocyclopentadiene
5-tert-butyl-1,2,3,4,5-pentachlorocyclopentadiene
1,2,3,4,5-pentachloro-5-octadecylcyclopentadiene
1,2,3,4,5-pentachloro-5-cyclopentylcyclopentadiene
5-allyl-1,2,3,4,5-pentachlorocyclopentadiene
1,2,3,4,5-pentachloro-5-propargylcyclopentadiene
5-benzyl-1,2,3,4,5-pentachlorocyclopentadiene
1,2,3,4,5-pentachloro-5-phenylcyclopentadiene
1,2,3,4,5-pentachloro-5-(p-chlorophenetyl)cyclopentadiene
1,2,3,4,5-pentachloro-5-(2-chloroethyl)cyclopentadiene
1,2,3,4,5-pentachloro-5-(2,2,2-trichloroethyl) cyclopentadiene
1,2,3,4,5-pentachloro-5-(2,2,2-trichloroethyl) cyclopentadiene
1,2,3,4,5-pentachloro-5-(p-iodocinnamyl)cyclopentadiene
1,2,3,4,5-pentachloro-5-(2-cyanoethyl)cycopentadiene
1,2,3,4,5-pentachloro-5-(2-triocyanopropyl)cyclopentadiene
1,2,3,4,5-pentachloro-5-methoxymethylcyclopentadiene
1,2,3,4,5-pentachloro-5-(2-ethylthioethyl) cyclopentadiene
5(5-allylsulfinylpentyl)-1,2,3,4,5-pentachlorocyclopentadiene
1,2,3,4,5-pentachloro-5-(p-methylsulfonylbenzyl) cyclopentadiene
1,2,3,4,5-pentachloro-5-(2-dimethylaminoethyl) cyclopentadiene
1,2,3,4,5-pentachloro-5-(3-pentanon-1-yl) cyclopentadiene
5(2-acetoxyethyl)-1,2,3,4,5-pentachlorocyclopentadiene
1,2,3,4,5-pentachloro-5-methoxycarbonylmethyl-cyclopentadiene
1,2,3,4,5-pentachloro-5-(3-hydroxypropyl) cyclopentadiene
1,2,3,4,5-pentachloro-5-(p-mercaptobenzyl) cyclopentadiene
5(m-aminophenetyl)-1,2,3,4,5-pentachloro-cyclopentadiene
1,2,3,4,5-pentachloro-5-furfurylcyclopentadiene
1,2,3,4,5-pentachloro-5-tetrahydrofurfuryl-cyclopentadiene
1,2,3,4,5-pentachloro-5-thenylcylclopentadiene
1,2,3,4,5-pentachloro-5[3-(p-nitrophenyl)propyl] cyclopentadiene
1,2,3,4,5-pentachloro-5-(2-pyridinemethyl) cyclopentadiene
1,2,3,4,5-pentachloro-5-(4-morpholineethyl) cyclopentadiene
1,2,3,4,5-pentachloro-5-(1,4,5,6,7,7-hexachloro-5-norbornen-2-yl-methyl)cyclopentadiene
1,2,3,4,5-pentachloro-5-(cyclopropylmethyl) cyclopentadiene Although many different substituted cyclopentadienes may be prepared the most readily available and commercially practicable are those derived from the hexahalocyclopentadienes and particularly from hexachlorocyclopentadiene, which may be reacted with any phosphite having the desired organic group in the ester portion, that is the RO radical as will be shown hereinafter. These are very important and valuable componds. They may be characterized by the generic structure

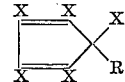

wherein X is a halogen and R is the described organic radical.

Suitable phosphites for introducing the organic radicals into the halocyclopentadiene molecule are those having the general structure

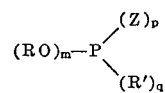

which must contain at least one (RO)-group and may contain no more than two of the Z and R' groups; R and R' groups being organic radicals and Z being a halogen atom; $m+p+q=3$.

In the above structural formula when $q$ is 1 the reactants will be phosphonites; when $q$ is 2 the reactants will be phosphinites; and when $q$ is 0 the reactants will be phosphites.

The phosphite reactants are of several different types. The most readily available trivalent phosphorus esters are the trisubstituted phosphites; including the trialkyl phosphites, such as trimethyl phosphite, triisopropyl phosphite, tri-n-butyl phosphite, tris(2-chloropropyl) phosphite, tris (3-nitro-n-butyl) phosphite, tris(2-ethylhexyl) phosphite, tridodecyl phosphite, and trioctadecyl phosphite; the trialkenyl phosphites, such as the triallyl phosphite, tris(2-chloroallyl) phosphite, tris(bromocrotyl) phosphite, tris (3-nitrobutenyl) phosphite, tris(undecyl - 10 - en - 1-yl) phosphite, the trialkynyl phosphites, such as the tripropargyl phosphite, tritetrolyl phosphite and tris(undecyl-10-yn-1-yl) phosphite; the triaryl phosphites, such as triphenyl phosphite, trinaphthyl phosphite and tris(biphenylyl) phosphite; the tris(araliphatic) phosphites, such as tribenzyl phosphite, triphenethyl phosphite and tricinnamyl phosphite; the tris(alkaryl) phosphites, such as tritolyl phosphite, trixylyl phosphite, tris(dodecylphenyl) phosphite and the tris(methylnaphthyl) phosphite; the tricycloalkyl phosphites, such as tricyclohexyl phosphite, tricyclopentyl phosphite, tris(cyclohex-2-enyl) phosphite and tris(cyclopent-2-enyl) phosphite; the heterocyclic phosphites, such as tris(tetrahydrofurfuryl) phosphite; and the substituted derivatives of the above groups. These include all kinds of substituents which do not, under the conditions of the alkylation reaction, react with the trivalent phosphorus ester. Such substituents include the halo alkoxy, alkylthioxy, alkylamino, sulfinyl, acyloxy, hydroxyl, sulfonyl, amino, cyano, alkoxycarbonyl, acyl, carbonyl, tricarbonyl, nitro, thiocyano, alkenoxy, alkynoxy and mercapto.

Mixed phosphites containing a plurality of esterifying radicals (as distinguished from the symmetrical phosphites described above) are also useful, for example, diethyl methyl phosphite, benzyl 2 - ethoxy-ethyl phenyl phosphite, and cyclohexyl dimethyl phosphite. The unsymmetrical phosphite may contain two or three different hydrocarbonoxy (RO)-groups in any combination of the esterifying groups described in the next preceding paragraph. The mixed types, however, are usaully not preferred agents for introducing radicals on the cyclopentadiene because often mixtures of several substituted cyclopentadienes are obtained.

Other phosphites have one or two halogen atoms bonded to the phosphorus atom and these will have one or two available organic groups. This type of compound includes the halophosphites such as diethyl chlorophosphite, benzyl dibromophosphite, diallyl chlorophosphite, octadecyl dichlorophosphite, bis(ethoxypropyl) fluorophosphite, 3-nitrobutenyl dichlorophosphite, dimethyl iodophosphite and other phosphites containing less than two organic radicals and one or two halogen atoms.

The phosphonites containing only two esterifying groups, for example, the dimethyl methylphosphonite, the diethyl phenylphosphonite, the dipropyl benzylphosphonite, the dimethyl vinyl phosphonite, the diallyl chloroethylphosphonite, the bis(2-chloroethyl) dodecylphosphonite, the dicyclohexyl cyclohexylphosphonite and the dicinnamyl phenylphosphonite can also be used.

Although the phosphonites containing two like esterifying groups are preferred, because only one product can be formed, the mixed esters, which may form a mixture of the two possible cyclopentadienes, may also be used. Thus, compounds such as ethyl propyl ethylphosphonite, ethyl phenyl phenyl phosphonite, allyl methyl benzyl phosphonite, and others containing two different radicals described above as esterifying radicals and a single organic radical substituted on the phosphorus atom can be used.

When, however, the two esterifying groups in the phosphonite ester are of markedly different reactivity, it is possible to obtain a predominantly homogenous reaction product in which the group substituted on the cyclopentadiene molecule is derived from the more reactive esterifying organic radical. Such a general case exists when alkyl and aryl groups are the esterifying radicals, such as in methyl phenyl phenylphosphonite, and in which case always the aliphatic radical is substituted on the allylic carbon of the cyclopentadiene.

The cyclopentadienes may also be substituted by means of the phosphinite esters. These have only a single ester group and, therefore, only cyclopentadienes with the same alkyl group are formed. The useful phosphinites, that is those trivalent phosphorus esters which have two organic radicals bonded directly to the phosphorus atom and have a single organic radical as the esterifying group, include methyl dimethylphosphinite, ethyl methylisopropylphosphinite, isopropyl benzyl(2-chloroethyl)phosphinite, 2-chloroethyl diphenylphosphinite allyl diphenylphosphinite, and other phosphinites which contain a single group of any of the esterifying groups described above with respect to the phosphites or phosphonites and two groups, different or identical, also selected from the above described esterifying groups substituted directly on the phosphorus atom.

The reaction between the above described halogen substituted cyclopentadienes and the phosphite esters (including phosphonites and phosphinites) may be conducted with or without an inert organic liquid medium. Useful media include the aromatic hydrocarbons, such as benzene, toluene and the xylenes, the cycloaliphatic hydrocarbons, such as cyclohexane and cyclopentane, and the aliphatic hydrocarbons, such as n-pentane, n-hexane, and homologues and isomers thereof. In general any organic solvent which under the usually mild reaction conditions does not react with the trivalent phosphorus reagent can be used as the reaction medium. Ethers, esters, ketones, and even alcohols and halogenated solvents, such as $CCl_4$, $CHCl_3$, $C_2HCl_3$, $C_2Cl_4$ can be used if a very reactive substitution agent and a readily reactive halocyclopentadiene are used as the reactants. Either of the reagents is charged to reactor or dissolved in the medium and the other added thereto at a rate which permits a continuous but not too vigorous reaction as indicated by the increase in temperature. The reaction between the halogen substituted cyclopentadiene and the lower alkyl (up to 8 carbon atoms) phosphorus esters should usually be conducted with coolings as to maintain the temperature of the exothermic reaction below 10 or 15° C. Reaction at higher temperatures may produce little or none of the desired products. The reaction of phosphite esters of high molecular weight (the esterifying group with more than 8 carbons or smaller if the alkyl groups are substituted with electronegative groups such as halogenatoms) may be conducted satisfactorily at temperatures above 15° C. Many require heating at temperatures up to the reflux temperature to effect the optimum conversion.

When reactants of low reactivity are used both can be charged simultaneously to the reactor at a temperature which is below that of the threshold conditions and the desired conversion can be achieved by warming up to and keeping the reactants at a temperature range where the reaction proceeds at a convenient rate.

Pressure does not appear to be a critical factor in carrying out the alkylation reaction. It is preferred that the reaction be run in ordinary apparatus at atmospheric pressure. If desired, the reaction may be run at pressures either above or below atmospheric pressure without changing the character or yield of the process.

It is preferred, however, to exclude moisture from the reactor in order to prevent the hydrolysis of the phosphorus containing reactant or products. In cases where the trivalent phosphorus compound is sensitive to air oxidation, such as triallyl phosphite, tripropargyl phosphite, benzyl dimethyl phosphinite, it is preferred to apply a protecting neutral gas blanket such as nitrogen $CO_2$, argon, krypton, methane or neon.

After all of the reagents have been combined and the reaction completed, the desired product may be separated from the reaction mixture. This separation is a critical part of the reaction and may require an efficient distillation column and reduced pressures. If a solvent is used the first fraction recovered will usually be this solvent. At a somewhat higher temperature any unreacted phosphite, phosphonite, phosphinite and the by-product halophosphate, halophosphonate or halophosphinate will be obtained. A very substantial part of the product balance is the desired cyclopentadiene with the organic substituent derived from the esterifying group of the phosphorous ester. The distillate can be purified by further fractional distillation, or by recrystallization if the desired compound is crystalline. Since the most volatile portions and the high boiling residue, if any, contain all the phosphorus components, the novel reaction includes as a separation step the recovery of that portion of the distillate that is substantially free of phosphorus containing compounds.

It will be apparent by examining the various examples listed that the substituted cyclopentadienes have boiling points which vary widely depending upon the size and nature of the substituent group. Accordingly, the temperatures at which the products will be distilled from the reaction mixtures will vary similarly. The end point of the distillation of the alkylcyclopentadiene can be readily determined by observing temperatures. At this point the fractionation is stopped. Further purification may be effected by re-distillation, fractional crystallization, chromatography or selective hydrolysis.

A convenient end-point for the distillation of the alkyl substituted cyclopentadienes wherein the alkyl radicals have up to eight carbon atoms, is 100° C. at 0.5 mm. pressure. Accordingly, the reaction mixture is distilled to collect all products which have a boiling point below 100° C. at 0.5 mm.

In the purification of the volatile portion the fractions which will include all or most of the phosphorus containing components are discarded. The fraction which is substantially free of phosphorus in the desired product is the cyclopentadiene having the organic substituent. If a plurality of the desired compounds are present due to the use of mixed phosphites or phosphonates, they may usually be separated at this point by fractional distillation.

Another very useful way to separate the substituted cyclopentadiene from the phosphorus containing components is to hydrolyze, without any previous manipulation, the entire reaction product. Since the hydrolysis of the phosphorus containing compounds (which include eventually the unreacted starting phosphorous ester and the halophosphates, halophonates, halophosphinates) is quite rapid, it is very convenient, requiring only the stirring of the crude reaction product with water, which extracts into the aqueous phase all of the hydrolyzed phosphorous compounds. The remaining organic layer (which usually forms a heavy, water immiscible bottom layer) is thus rendered completely phosphorous free, because through hydrolysis all of the phosphorus containing components became water soluble.

Another improvement in the working of the products is achieved by steam distillation. After the hydrolysis of the phosphorus containing materials, steam is blown into the heterogenous mixture and the substituted cyclopentadiene product is forced over with the steam. The efficiency of this operation is indicated by the analysis of the steam distilled organic product, which is completely free of any phosphorus constituent. The work-up by steam distillation is especially recommended for the lower alkyl substituted cyclopentadienes.

In the following discussion the reaction of hexachlorocyclopentadiene with trimethyl phosphite is used to illustrate the mechanism which is believed to operate in the substitution (sometimes referred to as alkylation) of halocyclopentadienes by trivalent phosphorus esters.

The reaction starts apparently by the attack of the unshared electron pair of the phosphorous ester on the allylic halogen of the halocyclopentadiene molecule.

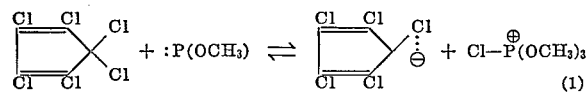
(1)

The driving force of this nucleophilic displacement step is the formation of the resonance stabilized cyclopentadienide ion

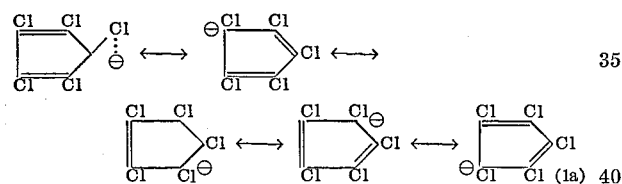
(1a)

which, according to the Huckel theory of aromaticity, has aromatic stability by fulfilling the 4n+2 rule and is best represented as a resonance hybrid.

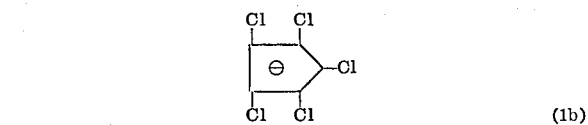
(1b)

The second step in the suggested mechanism of the alkylation reaction is again a nucleophilic displacement reaction but this time by the cyclopentadienide ion on carbon in an apparently irreversible step:

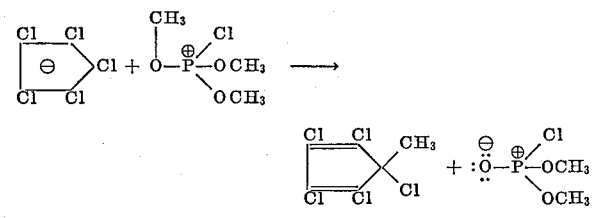
(2)

In this step the phosphorus product is resonance stabilized and is the hybrid of the following two structures:

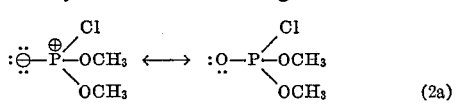
(2a)

The strongly exothermic nature of the alkylation reaction is probably the result of both the transition of the phosphorous ester into the quadrupli connected form (2a), and also of the replacement of an electronegative group (halogen) by an electron donor (alkyl group) in the cyclopentadiene molecule.

The proposed mechanism explains the experimental fact that whenever the structure of the starting halocyclopentadiene is such that it yields a symmetrical carbanion, such as (1b) and such as those derived from hexabromocyclopentadiene, hexafluorocyclopentadiene, 5-chlorocyclopentadiene, 5-chloropentafluorocyclopentadiene, etc., the structure of the alkylated product is solely that of a 5-alkylcyclopentadiene and no isomeric 1- or 2-alkylcyclopentadienes are present.

When the structure of the starting halocyclopentadiene is such that it does not yield a symmetrical carbanion intermediate then the alkylation reaction usually yields a mixture containing several or all of the possible isomeric alkylated products.

For example, the further methylation of pentachloro-5-methylcyclopentadiene yields a reaction mixture comprising all three of the possible tetrachlorodimethylcyclopentadienes which can be derived from the unsymmetrical carbanion intermediate

(3)

because cyclopentadienide (3) has no center of symmetry and every one of the five carbon atoms of the ring can become alkylated in Step (2). Since it has a plane of symmetry, only three (and not five) dimethyltetrachlorocyclopentadienes can be derived by the mechanism of Step (2) from the carbanion intermediate (3), namely tetrachloro-5,5 - dimethylcyclopentadiene (4A), tetrachloro-1,5-dimethylcyclopentadiene (4B) and tetrachloro-2,5-dimethylcyclopentadiene (4C):

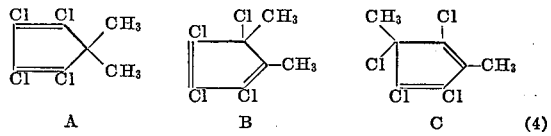
A B C (4)

Analysis of the products of the actual experiment indicated that all three of the above tetrachlorodimethylcyclopentadienes were present.

Similar reasoning applies also to the alkylation of 1,2,3,4,5-pentachlorocyclopentadiene which yields, through the carbanion intermediate (5),

(5)

all three of the derivable monoalkylated products:

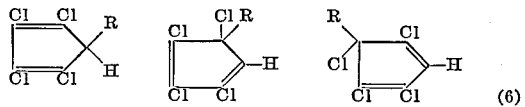
(6)

The criterion of the successful alkylation reaction is that the cyclopentadiene molecule has a halogen atom on the allylic carbon. This condition is fulfilled in the structures of dimethyltetrachlorocyclopentadienes (4B) and (4C) and these two compounds can actually be further alkylated. If trimethyl phosphite is used as the alkylating agent trichlorotrimethyl, dichlorotetramethyl, chloropentamethyl and hexamethylcyclopentadiene can, in decreasing proportions, be obtained under forcing conditions in the further methylation of the tetrachlorodimethylcyclopentadienes (4B) and (4C). Not all of the tri-, tetra- and penta-alkylhalocyclopentadienes can be converted into hexalkylcyclopentadiene, because as soon as two alkyl groups become substituted on the allylic carbon in the cyclopentadiene ring the molecule becomes resistant to the attack by the phosphite reagent. Statistical calculations indicate that, assuming equal reactivity on all of the five carbon atoms of the intermediate cyclopentadienide ions, the reaction mixture of the exhaustive alkylation experiment of 5-alkylpentahalocyclopentadienes contains 20% 5,5-dialkyl-, 32% trialkyl- (16% 1,5,5- and 16% 2,5,5-), 28.8% tetraalkyl (9.6% 1,2,5,5-, 9.6% 1,3,5,5-, 4.8% 1,4,5,5- and 4.8% 2,3,5,5-), 15.36% pentaalkyl- (7.68% 1,2,3,5,5- and 7.68% 1,2,4,5,5-) and only 3.84% of hexaalkylcyclopentadiene.

The following examples are selected to illustrate the wilde scope of the reaction and to describe several of the novel chemical compounds. These examples are not, however, intended to restrict the invention in any way but are presented solely to clearly illustrate the processes involved and to list some of the physical and biological properties of the novel compounds.

Example I.—Preparation of 1,2,3,4,5-pentachloro-5-ethylcyclopentadiene

A solution of 272.8 g. (1.0 mole) of hexachlorocyclopentadiene in 300 ml. of petroleum ether (pentane range) was charged to a 2 liter 3 neck flask equipped with stirrer, thermometer, dropping funnel and an exit line protected with a drying tube. The flask was immersed in ice-water and triethyl phosphite (182.8 g., 1.1 mole) was added slowly from the dropping funnel at such a rate that the temperature of the reaction mixture did not exceed $+15°$ C. After the addition was completed (which required 5 hours) the clear, brown solution was, after the stripping of the solvent, fractionated in vacuum through a 20″ column, filled with glass helices. A lower boiling fraction, 161 g., B.P. 39° C. at 0.4 mm., $n_D^{25}$ 1.4253 consisted of pure ethyl phosphorochloridate, $Cl(EtO)_2PO$, which, accordingly, was obtained in 93.4% yield. Then the temperature rose fast in the column and a pale yellow oil distilled over sharply at 50° C. and 0.18 mm. Infrared and elemental analyses indicated that the yellow oil, $n_D^{25}$ 1.5394, is pure 1,2,3,4,5-pentachloro-5-ethylcyclopentadiene.

Analysis for $C_7H_5Cl_5$.—Calculated: C, 31.56%; H, 1.89%; Cl, 66.55%. Found: C, 31.49%; H, 1.91%; Cl, 66.69%. Infrared maxima (s.=strong; m.=medium; w.=weak; sh.=shoulder): 3.36 m., 3.42 sh., 3.48 w., 6.23 s., 6.37 w., 6.86 m., 7.22 m., 7.56 w., 7.77 w., 8.11 s., 8.37 m., 9.28 sh., 9.40 m., 9.62 m., 10.44 m., 11.44 s., 12.41 s., 13.91 s. and 14.60 µs. Yield=235.0 g. or 88.0% of the theoretical.

The next example illustrates the preparation of the same compound under somewhat different conditions:

Example II.—1,2,3,4,5-pentachloro-5-ethylcyclopentadiene

A solution of triethyl phosphite (182.8 g., 1.1 mole) in 200 ml. of petroleum ether (pentane range) was charged to the equipment of the preceding example, which was immersed into a rock-salt-ice mixture. When the solution of the solution reached 0° C. hexachlorocyclopenadiene (272.8 g., 1.0 mole), dissolved in 100 ml. of light petroleum ether, was added slowly to the well stirred solution at such a rate that the temperature of the mixture did not exceed $+5°$ C. The addition required 10 hours. The clear, brown solution was poured with good stirring into a 5 liter 3 neck flask containing 2 liters of water and, after 1 hour of stirring, the product was steam distilled. After the separation of the low boiling petroleum ether 1,2,3,4,5-pentachloro-5-ethylcyclopentadiene, completely free of any phosphorus compound, distilled over as a pale yellow heavy oil, $n_D^{25}$ 1.5398, the infrared spectrum of which matched perfectly that of the previous example. The product weighed 257.0 g., which corresponds to a 96.4% yield.

Example III.—1,2,3,4,5-pentachloro-5-isopropylcyclopentadiene

Substituting triisopropyl phosphite (208.2 g., 1.0 mole) for triethyl phosphite but maintaining otherwise identical conditions with those of Example I resulted in the formation of isopropyl phosphorochloridate, $Cl(iso-PrO)_2PO$ (B.P. 48° C. at 0.55 mm., $n_D^{25}$ 1.4198, 197 g. or 98.5% yield) and of 1,2,3,4,5-pentachloro-5-isopropylcyclopentadiene, which had B.P. 67.5° C. at 0.42 mm., $n_D^{25}$ 1.5397 and which was obtained in 96% yield (269.0 g.).

Analysis for $C_8H_7Cl_5$.—Calculated: C, 34.26%; H, 2.52%; Cl, 63.22%. Found: C, 33.78%; H, 2.80%; Cl, 63.53%. Infrared maxima: 3.38 m., 6.24 s., 6.40 m., 6.64 m., 7.20 m., 7.30 m., 7.46 w., 7.66 w., 8.08 s., 8.20 sh., 8.37 m., 8.45 m., 8.68 m., 9.23 m., 10.15 m., 10.41 m., 10.45 sh., 10.73 w., 11.12 m., 11.82 s., 12.57 m., 13.88 s., 14.48 µs.

Example IV.—1,2,3,4,5-pentachloro-5-methylcyclopentadiene

When trimethyl phosphite, 175.7 g. (1.4 mole), was substituted for triethyl phosphite in the procedure described in Example II and the reaction was carried out at around 20° C. 224.0 g. of 1,2,3,4,5-pentachloro-methylcyclopentadiene was isolated by distillation between 42.5 and 44.0° C. at 0.27 mm.; $n_D^{25}$ 1.5460, in 89% yield.

Analysis for $C_6H_3Cl_5$.—Calculated: C, 28.56%; H, 1.19%; Cl, 70.25%. Found: C, 28.06%; H, 1.26%; Cl., 69.08%. Infrared maxima: 3.37 w., 3.44 w., 6.22 s., 6.36 w., 6.95 m., 7.27 m., 8.10 s., 8.31 s., 9.52 s., 9.66 s., 10.64 m., 11.61 m., 14.53 s.

When the workup of the reaction mixture was carried out by fractionation instead of hydrolysis, 140.0 g. (97%) of methyl phosphorochloridate, $Cl(CH_3O)_2PO$, (B.P. 75° C. at 15 mm., $n_D^{25}$ 1.4194) was isolated in addition to the alkylated product.

Example V.—5-n-butyl-1,2,3,4,5-pentachlorocylpentadiene

The replacement of triethyl phosphite with tri-n-butyl phosphite (250.3 g., 1.0 mole) in Example I resulted in the formation of 5-n-butyl-1,2,3,4,5-pentachlorocyclopentadiene, B.P. 72.5° C. at 0.28 mm., $n_D^{25}$ 1.5270 in 84% yield.

Analysis for $C_9H_9Cl_5$.—Calculated: C, 36.71%; H, 3.08%; Cl, 60.21%. Found: C, 36.24%; H, 3.08%; Cl, 60.20%. Infrared maxima: 3.40 s., 3.49 m., 6.21 s., 6.36 m., 6.82 m., 6.93 sh., 7.23 m., 7.50 w., 7.65 w., 7.93 m., 8.10 s., 8.42 m., 8.53 sh, 9.08 m., 9.14 m., 9.66 m., 9.93 w., 10.22 w., 10.26 w., 10.84 m., 11.08 w., 11.20 w., 11.48 m., 12.47 w., 12.70 sh., 13.20 sh., 13.45 s., 14.55 µs.

Example VI.—1,2,3,4,5-pentachloro-5(2-ethylhexyl)-cyclopentadiene

The substition of tris(2-ethylhexyl) phosphite (418.6 g., 1.0 mole) for triethyl phosphite in Example I resulted in the formation of 1,2,3,4,5-pentachloro-5(2-ethylhexyl)cyclopentadiene, which boiled between 106 and 107° C. at 0.31 mm., $n_D^{25}$ 1.5172 and which was obtained in 91% yield (320 g.).

Analysis for $C_{13}H_{17}Cl_5$.—Calculated: C, 44.53%; H, 4.90%; Cl, 50.57%. Found: C, 43.72%; H, 4.83%; Cl, 50.50%. Infrared maxima: 3.41 s., 3.49 sh., 6.22 s., 6.62 sh., 6.83 s., 7.23 m., 8.09 s., 8.45 m., 8.73 m., 9.07 w., 9.70 m., 10.50 w., 11.30 w., 12.48 s., 13.45 m., 14.55 m., 14.68 µsh.

Example VII.—1,2,3,4,5-pentachloro-5-cyclohexylcyclopenadiene

When triethyl phosphite of Example II was replaced with the equivalent amount of triscyclohexyl phosphite and the reaction was carried out between 17 and 35° C. 1,2,3,4,5-pentachloro - 5 - cyclohexylcyclopentadiene was isolated by distillation between 95 and 98° C. at 0.15 mm.; $n_D^{25}$ 1.5564.

Analysis for $C_{11}H_{11}Cl_5$.—Calculated: C, 41.22%; H, 3.46%; Cl, 55.32%. Found: C, 41.40%; H, 3.45% Cl, 54.39%. Infrared maxima: 3.44 s., 3.53 m., 6.24 s., 6.65 m., 6.90 s., 7.32 w., 7.41 w., 7.70 m., 7.87 m., 8.07 s., 8.21 sh., 8.38 m., 8.52 m., 8.65 w., 8.86 m., 8.96 w., 9.25 sh., 9.47 m., 9.57 m., 9.75 sh., 10.23 m., 10.44 m., 10.79 m., 11.05 m., 11.25 w., 11.50 m., 11.80 m., 12.57 s., 13.31 s., 14.36 s., 14.77 m., 15.37 m.

Example VIII.—5-allyl-1,2,3,4,5-pentachlorocyclopentadiene

Carrying out the procedure of Example II between 4 and 25° C. and replacing triethyl phosphite with triallyl phosphite (820 g., 1.39 mole) resulted in the formation of 211 g. (0.76 mole, 76% yield) of 5-allyl-1,2,3,4,5-pentachlorocyclopentadiene, B.P. 63° C. at 0.48 mm., $n_D^{25}$ 1.5450.

Analysis for $C_8H_5Cl_5$.—Calculated: C, 34.51%; H, 1.81%; Cl, 63.68%. Found: C, 34.41%; H, 2.01%; Cl, 63.23%. Infrered maxima: 3.26 w., 3.36 w., 3.44 w., 6.07 m., 6.21 s., 6.36 m., 6.95 m., 7.04 w., 7.75 w., 7.92 sh., 8.09 s., 8.50 m., 9.11 m., 7.71 m., 10.08 m., 10.74 s., 11.07 m., 11.48 m., 12.98 s. and 14.49 μs.

When the workup of the reaction mixture was carried out by fractionation instead of steam distillation, allyl phosphorochloridate was obtained as a colorless liquid, B.P. 40° C. at 0.27 mm., $n_D^{21}$ 1.4410.

Example IX.—1,2,3,4,5-pentachloro-5(2-chloroethyl)cyclopentadiene

The procedure of Example IX was modified by substituting tris(2-chloroethyl) phosphite (269.6 g., 1.0 mole) for triethyl phophite and benzene (200 ml.) for petroleum ether and raising the reaction temperature to 75–88° C.; a 60% yield (189 g.) of 1,2,3,4,5-pentachloro-5(2-chloroethyl)cyclopentadiene was obtained as a pale yellow oil, B.P. 87° C. at 0.54 mm., $n_D^{25}$ 1.5585.

Aanlysis for $C_7H_4Cl_6$: Calculated: C, 27.94%; H, 1.36%; Cl, 70.70%. Found: C, 27.10%; H, 1.40%; Cl, 70.78%. Infrared maxima: 3.36 w., 6.21 s., 6.36 w., 6.87 m., 7.00 sh., 7.47 w., 7.52 w., 7.94 m., 8.09 s., 8.30 w., 8.82 m., 9.55 m., 9.75 m., 9.87 sh., 11.26 m., 12.63 m., 14.15 s., 14.50 μs.

Example X.—1,2,3,4,5-pentachloro-5(2-methoxyethyl)cyclopentadiene

The replacement of triethyl phosphite with tris(2-methoxyethyl) phosphite (307.2 g., 1.2 mole) in Example II and the raising of the reaction temperature to 25–43° C. resulted in the formation of 1,2,3,4,5-pentachloro-5(2-methoxyethyl)cyclopentadiene, B.P. 71° C. at 0.22 mm., $n_D^{25}$ 1.5326.

Analysis for $C_8H_7Cl_5O$: Calculated: C, 32.41%; H, 2.38%; Cl, 59.81%. Found: C, 31.34%; H, 2.56%; Cl, 60.49%. Infrared maxima: 3.41 sh., 3.47 m., 6.20 s., 6.34 w., 6.75 m., 6.87 m., 6.98 m., 7.19 m., 7.48 w., 7.76 m., 9.08 s., 8.29 m., 8.42 m., 8.82 s., 9.38 m., 9.64 m., 10.36 sh., 10.48 m., 11.35 m., 12.60 w., 13.37 m., 13.84 m., 14.52 μs.

Example XI.—1,2,3,4,5-pentachloro-5-ethylcyclopentadiene via phosphonites

When ethyl phenylphosphonite (200.0 g., 1.1 mole) was substituted for triethyl phosphite in the procedure of Example I a substantial yield of 1,2,3,4,5-pentachloro-5-ethylcyclopentadiene was obtained, the infrared spectrum of which matched perfectly that of Example I.

Example XII.—1,2,3,4,5-pentachloro-5-ethylcyclopentadiene via phosphinites

When ethyl phenylphosphinite (232 g., 1.0 mole) was substituted for triethyl phosphite and the reaction temperature was raised to 25 to 40° C. in the procedure of Example I a substantial yield, 1,2,3,4,5-pentachloro-5-ethylcyclopentadiene was obtained, identical in every respect with the product of Example I.

Example XIII.—1,2,3,4,5-pentabromo-5-ethylcyclopentadiene

The procedure of Example I was duplicated except that hexabromocyclopentadiene (539.6 g., 1.0 mole) was used in place of hexachlorocyclopentadiene and hexane (2.5 l.) was used in place of petroleum ether. A 93% yield of 1,2,3,4,5-pentabromo-5-ethylphosphite was obtained as a heavy oil $n_D^{25}$ 1.6423, which decomposes above 130° C.

Infrared maxima: 3.38 m., 3.42 sh., 3.50 sh., 6.21 m., 6.37 s., 6.87 m., 7.24 m., 7.57 w., 7.75 w., 7.95 w., 8.18 w., 8.38 s., 9.40 m., 9.87 m., 10.75 w., 11.06 w., 11.26 w., 12.05 m., 12.46 m., 13.48 m., 14.08 m., 14.30 m., 15.12 μm. Isolated was also, through fractionation, ethyl phosphorobromidate, $Br(C_2H_5O)_2PO$, B.P. 58–59° C. at 0.25 mm., $n_D^{25}$ 1.4443, in better than 78% yield.

Example XIV.—Tetrachloroethylcyclopentadienes

The replacement of hexachlorocyclopentadiene with 1,2,3,4,5-pentachlorocyclopentadiene (238.4 g., 1.0 mole) in the proceedure of Example I while raising the temperature to 22 to 52° C. resulted in the formation of isomeric tetrachloroethylcyclopentadienes, B.P. 49–52° C. at 0.22 mm., $n_D^{25}$ 1.5325 in better than 80% yield.

Analysis for $C_7H_6Cl_4$: Calculated: C, 36.24%; H, 2.61%; Cl, 61.15%. Found: C, 35.20%; H, 2.60%; Cl, 61.70%.

Example XV.—Tetrachlorodimethylcyclopentadienes 1,2,3,4,5 - pentachloro-5-methylcyclopentadiene (252.4 g., 1.0 mole) was placed in the 3 neck flask described in Example I and, after being heated to 50° C., trimethyl phosphite (145.0 g., 1.17 mole) was added slowly from the dropping funnel at such a rate as to maintain the temperature of the exothermic reaction close to 50° C. After the addition of the phosphite was completed (in 1.5 hour) the clear, brown solution was heated for 3 more hours between 50 and 53° C. Hydrolysis of the reaction mixture and subsequent steam distillation yielded a mixture of 1,2,3,4-tetrachloro-5,5-dimethylcyclopentadiene, 2,3,4,5-tetrachloro-1,5 - dimethylcyclopentadiene and 1,3,4,5 - tetrachloro-2,5-dimethylcyclopentadiene in 94% yield (218.0 g., 0.94 mole) in form of a pale yellow oil, B.P. 40 to 47° C. at 9.42 mm., $n_D^{25}$ 1.5287–1.5321.

Analysis for $C_7H_6Cl_4$: Calculated: C, 36.24%; H, 2.61%; Cl, 61.15%. Found: C, 36.24%; H, 2.83%; Cl, 61.17%.

Infrared spectrum of the reaction product indicated the presence of all three isomeric dimethyltetrachlorocyclopentadienes. Fractionation through a good column separated the mixture into pure components, each of which had a characteristic infrared spectrum.

Example XVI.—Tetrachlorodiethylcyclopentadienes

Adding to 1,2,3,4,5-pentachloro-5-ethylcyclopentadiene (266.4 g., 1.0 mole) triethyl phosphite (174.5 g., 1.05 mole) at 92–98° C. in the course of 1 hour and heating the reaction mixture for 6 more hours at 95° under conditions similar to those of the preceding example resulted in the formation of all three isomeric tetrachlorodiethylcyclopentadienes in 87% yield (226.0 g.). The mixture of the three dienes had B.P. 129–131° C. at 24 mm. and $n_D^{25}$ 1.5198–1.5201.

Analysis for $C_9H_{10}Cl_4$.—Calculated: C, 41.57%; H, 3.99%; Cl, 54.55%. Found: C, 42.21%; H, 4.14%; Cl, 54.37%. Infrared spectrum of the crude product indicated the presence of isomeric compounds.

Example XVII.—Tetrachloroethylmethylcyclopentadienes

When 1,2,3,4,5-pentachloro - 5 - methylcyclopentadiene (252.4 g., 1.0 mole) was reacted with triethyl phosphite (174.5 g., 1.05 mole) under conditions described in Example XV, a 78% yield (192 g.) of the isomeric mixture containing 1,2,3,4-tetrachloro-5-ethyl-5-methylcyclopentadiene, 2,3,4,5-tetrachloro-5-ethyl-1-methylcyclopentadiene and 1,3,4,5-tetrachloro-5-ethyl - 2 - methylcyclopentadiene was obtained in form of a pale oil which had B.P. 45–46.5° at 0.32 mm. and $n_D^{25}$ 1.5257.

Analysis for $C_8H_8Cl_4$.—Calculated: C, 39.06%; H, 3.28%; Cl, 57.66%. Found: C, 39.27%; H, 3.31%; Cl, 58.10%.

Example XVIII.—Tetrachloroethylmethylcyclopentadienes

When 1,2,3,4,5 - pentachloro - 5 - ethylcyclopentadiene (252.4 g., 1.0 mole) was reacted with trimethyl phosphite (136.5 g., 1.1 mole) under the reaction conditions of Example XV and 80% yield (197 g.) of a pale yellow oil, B.P. 48–49.5° C. at 0.26 mm., $n_D^{25}$ 1.5285 was obtained, the infrared spectrum of which indicated that it was different from the crude product of the previous example and that it contained 1,2,3,4-tetrachloro-5-methyl-5-ethylcyclopentadiene in admixture with 2,3,4,5-tetrachloro-5-methyl-1-ethylcyclopentadiene and 1,3,4,5-tetrachloro-5-methyl-2-ethylcyclopentadiene.

Analysis for $C_8H_8Cl_4$.—Calculated: C, 39.06%; H, 3.28%; Cl, 57.66%. Found: C, 38.62%; H, 3.32%; Cl, 58.00%.

Example XIX.—Tetrachlorodi(2-methoxyethyl)cyclopentadienes

Fractionation of the distillation residue of Example X yielded a pale yellow oil (66 g.), B.P. 96° at 0.15 mm., $n_D^{25}$ 1.5174, the elemental and spectral analysis of which indicated that it is a mixture of isometric tetrachlordi(2-methoxyethyl)cyclopentadienes. The yield accordingly was 20.6%.

Analysis for $C_{11}C_{14}Cl_4O_2$.—Calculated: C, 41.28%; H, 4.41%; Cl, 44.32%. Found: C, 40.55%; H, 4.34%; Cl, 44.60%. Infrared spectrum of the product showed strong ether band at 8.95µ.

Example XX.—Tetrachlorodicyclohexylcyclopentadiene

The distillation residue of Example VII (43.0 g., 0.117 mole, $n_D^{25}$ 1.5556) solidified completely on standing at room temperature. Recrystallization from methanol yielded pale yellow crystals, M.P. 94–95° C.; the yield was 11.7%.

Analysis for $C_{17}H_{22}Cl_4$.—Calculated: C, 55.45%; H, 6.02%; Cl, 38.52%. Found: C, 56.72%; H, 5.81%; Cl, 37.45%. Infrared maxima: 3.44 s., 3.52 s., 6.18 s., 6.89 s., and 12.56 s., 13.41 mm. and many adsorption bands of medium and weak intensity characteristic of the cyclohexane rings.

Example XXI.—Tetrachloromethylcyclopentadienes

The replacement of hexachlorocyclopentadiene with 1,2,3,4,5-pentachlorocyclopentadiene (238.4 g., 1.0 mole) and of triethyl phosphite with trimethyl phosphite (136.5 g., 1.1 mole) in Example II and raising the temperature of the reaction to 35–40° C. resulted in the formation of isomeric tetrachloromethylcyclopentadienes, B.P. 62.5–64.0° C. at 1.70 mm., $n_D^{25}$ 1.5453–1.5496.

Example XXII.—1,2,3,4,5-pentabromo-5-methylcyclopentadiene

The substitution of trimethyl phosphite (136.5 g., 1.1 mole) for triethyl phosphite, of hexabromocyclopentadiene (539.6 g., 1.0 mole) for hexachlorocyclopentadiene and of hexane (2.5 l.) for petroleum ether in Example I and raising the reaction temperature to 30° C. resulted in the formation of 1,2,3,4,5-pentabromo-5-methylcyclopentadiene in better than 90% yield; $n_D^{25}$ 1.6618, melting point 60–61° C.

Analysis for $C_6H_3Br_5$.— Calculated: C, 15.18%; H, 0.64%; Br, 84.18%. Found: C, 14.67%; H, 1.09%; Br, 84.54%. Infrared maxima: 3.38 w., 3.45 w., 6.21 m., 6.36 s., 6.96 m., 7.28 w., 7.88 w., 8.10 w., 8.38 s., 8.68 m., 8.80 m., 9.16 m., 9.59 m., 9.79 m., 10.05 m., 10.22 w., 10.44 w., 10.72 w., 11.03 w., 11.22 w., 12.33 w, 13.51 s., 14.08 µm. When fractionation instead of hydrolysis was used in the workup of the reaction products a substantial yield of methyl phosphorobromidate, $Br(CH_3O)_2PO$, B.P. 54–57° C. at 0.7–0.9 mm., $n_D^{25}$ 1.4462 was obtained as a second product.

Example XXIII.—Polyalkylation

A mixture of tetrachlorodimethylcyclopentadienes, obtained by the procedure of Example XV, was charged to the 3 neck flask described in Example I and heated, under nitrogen atmosphere, to 125° C. At this temperature, one molar equivalent of trimethyl phosphite was added to the well stirred liquid at such a rate as to keep the temperature of the ensuing exothermic reaction between 125 and 135° C. After the addition of the phosphite, which required a period of 4 hours, the reaction mixture was kept with stirring at 130° C. for 2 more hours. The reaction mixture was, after cooling to room temperature, hydrolyzed and steam distilled. The steam distillate, which contained predominately a mixture of trichlorotrimethylcyclopentadienes, was then further reacted with excess of trimethyl phosphite at 135–140° C., in a nitrogen atmosphere. Workup, consisting of hydrolysis, steam distillation and fractionation, yielded a mixture of hexamethylcyclopentadiene, chloropentamethylcyclopentadienes and dichlorotetramethylcyclopentadienes.

A pure dichlorotetramethylcyclopentadiene fraction had B.P. 94–98° C. at 12 mm. and $n_D^{25}$ 1.4935.

Analysis for $C_9H_{12}Cl_2$.—Calculated: Cl, 37.1%, Found: Cl, 37.9%. Infrared maxima: 3.40, 6.15, 6.88, 7.23, 7.34, 7.76, 8.06, 9.36, 9.68, 10.29, 19.52, 12.30, 12.52 and 15.0µ. The distillation fractions rich in chloropentamethylcyclopentadienes and hexamethylcyclopentadiene had somewhat lower boiling points and $n_D^{25}$ 1.480 and $n_D^{25}$ 1.470, respectively.

Example A

A mixture 2 mole proportions of 5-methylpentachlorocyclopentadiene and 3 mole proportions of bicyclo(2,2,1)-hepta-2,5-diene was charged to a closed reaction vessel provided with thermometer and a reflux condenser. The reaction mixture was refluxed at the initial temperature of 106.5° C. The pale yellow mixture gradually darkened and the reflux temperature increased to 141° C. in about 23 hours. A vacuum was applied and the excess of bicyclo (2,2,1)hepta-2,5-diene was distilled, removed by distillation. The residue was then fractionated and the Diels-Alder adduct was recovered at 117–120° C. at 0.22 mm. which solidified upon cooling. The product was then recrystallized from n-hexane as white crystals (M.P. 96–98° C.). This was identified as:

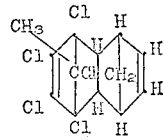

This product had insecticide activity providing 100% kill of mosquito larvae at 0.1 p.p.m. and on red flour beetle at 0.5% concentration.

Example B

The procedure of Example A above was repeated except that pentachloro - 5 - ethylcyclopentadiene was used in place of pentachloro-5-methylcyclopentadiene. The product 1,2,3,4,10-pentachloro-10-ethyl-1,4,4a,5,8,8a-hexahydro-1,4,5,8-dimethanonaphthalene (B.P. 107° C. at 0.06 mm. $n_D^{25}$ 1.5628) was identified as a compound of the structure:

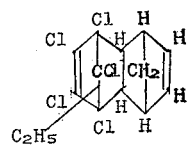

The various cyclopentadines with organic radicals substituted in the 5 position may be reacted with any of a wide variety of known cyclic and acylic dienes to form biologically active Diels-Alder adducts.

The embodiments of the invention in which an exclusive property or privilege is claimed are defined as follows:

1. The method of preparing a compound of the structure

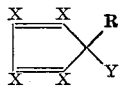

wherein X is selected from the class consisting of chlorine and bromine; wherein Y is selected from the class consisting of X and R; and wherein R is selected from the class consisting of alkyl having up to 8 carbon atoms, 2-chloroethyl, 2-methoxyethyl, allyl and cyclohexyl; which comprises combining under reactive conditions a hexahalocyclopentadiene of the formula $C_5X_6$ and an ester of a phosphorus acid having the structure

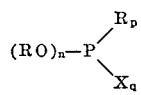

wherein $n$ is an integer from one to three; wherein $p$ and $q$ are each integers from zero to two, provided that the sum of $n$, $p$ and $q$ is three; mixing the reaction product with sufficient water to completely hydrolyze the phosphorus compounds, separating the phosphorus-free organic layer, and separating the desired product therefrom by fractional distillation.

2. The method of preparing 5-alkyl-1,2,3,4,5-pentachlorocyclopentadiene wherein the alkyl radical has up to 8 carbon atoms, which comprises gradually combining, at a reactive temperature, hexachlorocyclopentadiene and an ester of a phosphorus acid of the structure

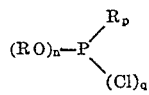

wherein R is an alkyl radical of up to eight carbon atoms, wherein $n$ is an integer from one to three, wherein $p$ and $q$ are integers from zero to two, and wherein the sum of $n$, $p$ and $q$ is three; mixing the reaction mixture with sufficient water to hydrolyze the phosphorus containing compounds, separating the two liquid phases and separating the desired product from the phosphorus-free organic phase by distillation.

3. The method of preparing 5-alkyl-1,2,3,4,5-pentachlorocyclopentadiene wherein the alkyl radical has up to 8 carbon atoms, which comprises gradually combining at a reactive temperature below 15° C., hexachlorocyclopentadiene and an ester of a phosphorus acid of the structure

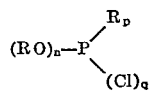

wherein R is an alkyl radical of up to eight carbon atoms, wherein $n$ is an integer from one to three, wherein $p$ and $q$ are integers from zero to two, and wherein the sum of $n$, $p$ and $q$ is three; mixing the reaction mixture with sufficient water to hydrolyze the phosphorus containing compounds, separating the two liquid phases and separating the phosphorus-free organic phase by fractional distillation.

4. A process for the production of an alkyl substituted polychlorocyclopentadiene which comprises reacting together at a temperature between 0° and 135° C. a mixture of hexachlorocyclopentadiene and a derivative of an acid of trivalent phosphorus selected from the group consisting of trialkyl phosphite, each alkyl group having up to 8 carbon atoms, tris (2-methoxy ethyl) phosphite and tris (cyclohexyl) phosphite, subjecting the resulting mixture to hydrolysis, separating the organic phase and recovering the alkyl, cyclohexyl or 2-methoxy-ethyl substituted polychlorocyclopentadiene product.

References Cited

UNITED STATES PATENTS

| | | |
|---|---|---|
| 2,597,016 | 5/1952 | McBee et al. |
| 2,622,096 | 12/1952 | Ladd _____ 260—461.310 |
| 2,721,160 | 10/1955 | Newcomer _____ 260—648 |
| 2,726,232 | 12/1955 | Upson |
| 2,806,049 | 9/1957 | Raab et al. _____ 260—461.310 |
| 2,847,481 | 8/1958 | Maude et al. |
| 2,908,723 | 10/1959 | Rucker |
| 3,037,044 | 5/1962 | Bruson et al. ____ 260—461.303 |
| 3,270,066 | 8/1966 | Von Brachel et al. ____ 260—648 |

FOREIGN PATENTS

| | | |
|---|---|---|
| 557,104 | 5/1958 | Canada |
| 646,985 | 12/1960 | Great Britain. |

OTHER REFERENCES

Dufraisse et al., Chemical Abstracts, vol. 49 (1955), col. 15, 846f.

Fuson et al., ibid, vol. 48 (1954), col. 3, 270–1.

Kosolapoff, "Organophosphorus Compounds," John Wiley and Son, N.Y., publishers (1950), p. 203.

Pummerer et al, "Chemical Abstracts," vol. 52 (1958), col. 16, 241–2.

Rasjon, ibid, vol. 53 (1959), col. 21, 808b.

LEON ZITVER, Primary Examiner

H. T. MARS, Assistant Examiner

U.S. Cl. X.R.

260—247, 290, 293, 346.1, 453, 454, 455, 464, 465, 468, 476, 479, 563, 607, 609, 611, 999